United States Patent [19]
Geider et al.

[11] Patent Number: 5,773,037
[45] Date of Patent: Jun. 30, 1998

[54] EXTRUSION HEAD WITH COLOR-CHANGING DEVICE

[75] Inventors: Ernst Geider, St-Sulpice; Hans Jaun, La Conversion, both of Switzerland

[73] Assignee: Nokia-Maillefer Holding SA, Ecublens, Switzerland

[21] Appl. No.: 738,602

[22] Filed: Oct. 29, 1996

[30] Foreign Application Priority Data

Nov. 10, 1995 [EP] European Pat. Off. ............ 95 810 708

[51] Int. Cl.[6] .................................................. B29C 47/20
[52] U.S. Cl. ...................... 425/132; 425/113; 425/133.1; 425/462
[58] Field of Search ................................ 425/133.1, 123, 425/113, 462

[56] References Cited

U.S. PATENT DOCUMENTS

| Re. 34,711 | 8/1994 | Compagnon | 425/131.1 |
|---|---|---|---|
| 3,143,583 | 8/1964 | Haugwitz | 425/113 |
| 3,257,482 | 6/1966 | Schecter | 425/132 |
| 4,182,601 | 1/1980 | Hill | 425/133.1 |
| 4,761,129 | 8/1988 | Aste et al. | 425/133.1 |
| 4,832,960 | 5/1989 | Compagnon | 425/131.1 |
| 4,998,870 | 3/1991 | Seibert | 425/463 |
| 5,108,683 | 4/1992 | Anand | 425/113 |
| 5,197,514 | 3/1993 | Jaun | 137/597 |
| 5,262,119 | 11/1993 | Smith | 425/133.1 |

FOREIGN PATENT DOCUMENTS

| A-566870 | 2/1924 | France . |
|---|---|---|
| A-2712910 | 9/1978 | Germany . |
| A-2921943 | 12/1980 | Germany . |
| A-3735279 | 4/1989 | Germany . |
| A-8705258 | 9/1987 | WIPO . |

*Primary Examiner*—Robert Davis
*Attorney, Agent, or Firm*—Oliff & Berridge, PLC

[57] ABSTRACT

The device (2) for changing the outside coating color of the extruded product is seated directly in the extrusion head (1), thus minimizing the length of the duct (25) in which the colored extrudates would be liable to mix; on the other hand, since no colored extrudate can stagnate upstream from that duct, the colored coating is always composed of freshly extruded material. Thus, the transition from one color to another is extremely short on the finished product, so that no faulty material is to be found on that product. The color changing device is essentially composed of an axially movable needle-valve (24) which can be actuated by various means. Through design modifications of this needle-valve, a two-color coating can be produced. An extrusion head equipped with such a device is particularly well adapted to the solid or expanded insulation of electric conductors, although other types of extruded objects can also be produced according to the same principle.

11 Claims, 2 Drawing Sheets

EXTRUSION HEAD WITH COLOR-CHANGING DEVICE

This invention relates to extruding equipment, and more particularly to an extrusion head of the type capable of extruding a surface layer, preferably colored, over a first layer, preferably not colored. The invention further relates to an extrusion line of the type equipped with a first extruder and with two auxiliary extruders. The contents of Application No. 95 810 708.8, filed Nov. 10, 1995, in Europe, is hereby incorporated by reference.

At least two methods have been proposed for extruding a product, e.g., an insulated conductor, and allowing this product to have a certain color.

A first method, the older one, requires only one extruder, into the hopper of which a master batch of the desired color is introduced simultaneously with the insulation pellets. In the case of an insulated conductor, the entire thickness of the insulation will be of the desired color. This method includes numerous drawbacks, particularly when it is desired to change the color of the product: there are two possible courses of action, viz., either to stop the machine in order to clear it out completely and clean it before reloading it with a new color mixture, or to put the new master batch directly into the hopper of the operating machine, thus causing the extrusion of a certain quantity of material containing a mixture of the two coloring agents in variable proportions until all traces of the first coloring agent have disappeared from the extrudate. Both of these variations bring about an appreciable reduction of the productivity of the extruder, as well as a high consumption of master batch, an expensive product. Moreover, the presence of the master batch within the insulation may alter or modify its dielectric values.

The second method, described particularly in U.S. Pat. Nos. 4,832,960 and RE 34,711, consists in providing a two-layer insulation, viz., a lower first layer of insulation, usually consisting of a colorless extrudate, upon which a relatively thin, colored outer layer is superimposed. The dielectric qualities of such a two-layer extrudate are clearly more stable than those of a product colored throughout inasmuch as the insulating product always has the same composition and because the colored layer is very thin as compared with the thickness of the lower layer. The aforementioned patent describes an extrusion head equipped with a device permitting the color of this colored outer film layer to be changed in a simple way, this device being placed slightly upstream from the extrusion head in the direction of flow of the material. This upstream position of the color-changing device represents a drawback insofar as when the color is changed, the new color can mix with the old one over a certain distance, so that a not inconsiderable length of the extruded product, depending on the speed of the line, must subsequently be eliminated owing to the imprecise transition from one color to the other. Another drawback of this type of device which it would be well to eliminate stems from the fact that some extrudate which may have stagnated in the extrusion head, and thus deteriorated, may be found on the finished product.

It is therefore an object of this invention to provide an extrusion head capable of extruding two layers simultaneously, and equipped with a device by which the color of the outer layer may be changed, without encountering the drawbacks of prior art devices; in particular, the transition zone between the two colors on the finished product should be as small as possible, and no material which may have stagnated within the extrusion head should be found on the finished product.

Another object of the invention is to provide an extrusion head having a color-changing device which is simple to actuate and reliable to operate.

Still another object of the invention is to provide an extrusion head capable of extruding all the materials usual in this type of technology; especially, and in the particular case of extruding insulation onto a conductor, such insulation must be able to be either solid or of the expanded type.

A further object of the invention is to provide an extrusion head capable of extruding a two-color product.

Yet another object is to provide an extrusion line equipped with such an extrusion head.

It must be borne in mind that in order to achieve these different objects, it is necessary to work with high-viscosity extrudates, at high temperature, high pressure, and relatively high production speeds.

To this end, the extrusion head according to the present invention, of the type initially mentioned, is connected directly to a first extruder delivering an extrudate intended to form the first, non-colored layer, as well as to two other extruders, each delivering an extrudate of a different color intended to form the surface layer, the extrusion head comprising a selection device capable of selectively directing one or the other of the colored extrudates over the first layer.

The extrusion line according to the present invention, of the type initially mentioned, further comprises such an extrusion head.

Preferred embodiments of the invention will now be described in detail with reference to the accompanying drawings, in which.

Figure 1:
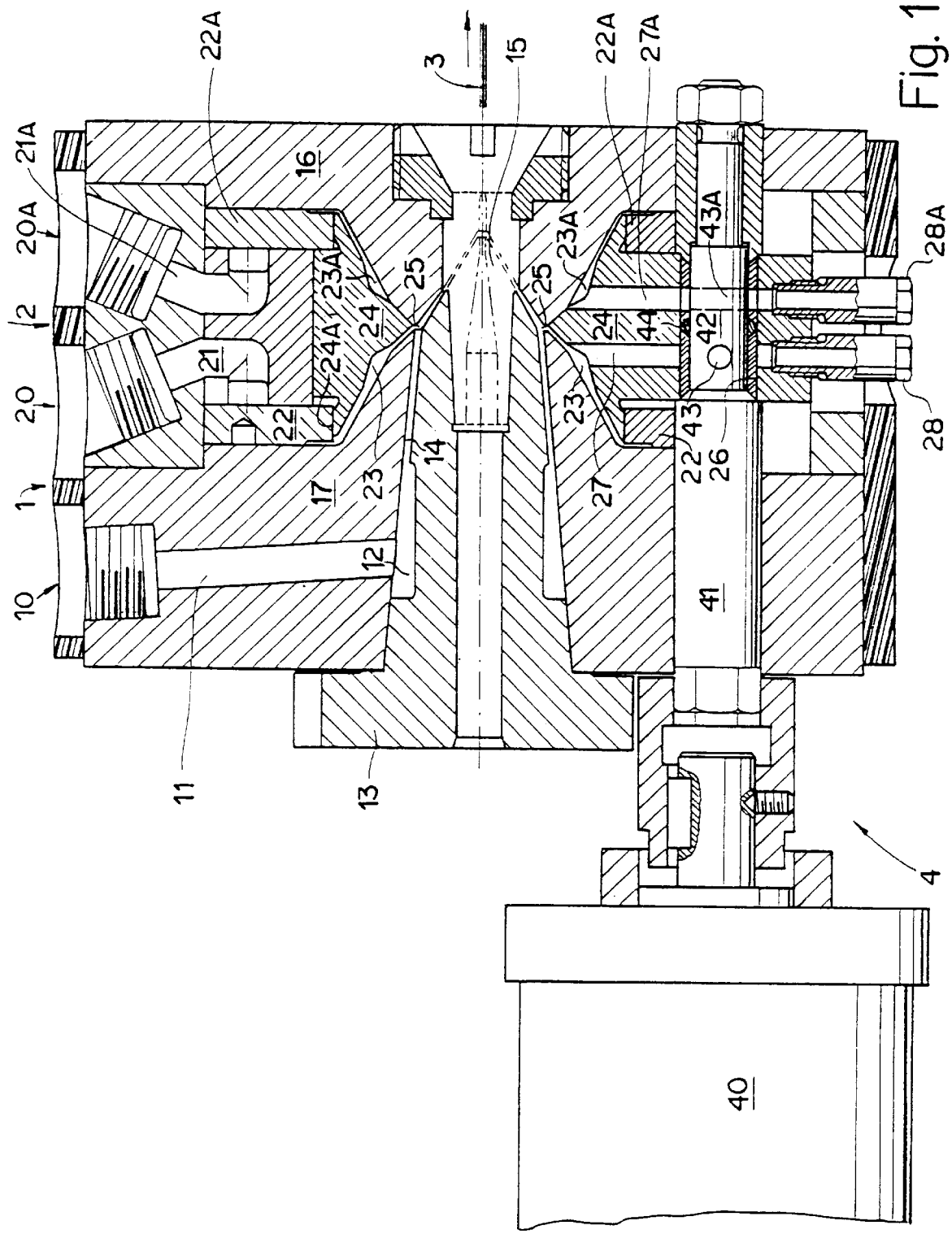
FIG. 1 is a sectional view of an extrusion head according to the invention.

FIG. 1 illustrates a first embodiment of the invention with an extrusion head 1 comprising in particular a first intake port 10 connected to a main extruder (not shown). Through a duct 11, extruded material coming from this main extruder is first carried radially through the extrusion head 1 toward a circumferential groove 12 surrounding a diestock 13, is then distributed all around the diestock 13 and follows an outer duct 14 toward a die 15. This extrudate coming from the main extruder will form the lower or insulating layer. This arrangement of the elements and this passage of the extrudate are generally known in the art. The extrusion head 1 is supplemented by a device 2 for selecting the color of the outside coating of the insulation. Two auxiliary extruders (not shown), each extruding a product of a different color, open out at a second intake port 20 and a third intake port 20A, respectively. Through bent lines 21 and 21A, the flows of extrudate coming from the auxiliary extruders are conveyed toward respective circular distributors 22 and 22A which, through a set of bores, direct the flows of material toward two annular chambers 23 and 23A, respectively, situated on either side of a movable needle-valve 24. The movable needle-valve 24 completely surrounds a front portion of the diestock 13 and is capable of moving slightly, on the order of 1 to 2 mm, along an axial direction, i.e., along the direction of travel of a conductor to be insulated within the head 1, by means to be described below. As seen in FIG. 1, the movable needle-valve 24 rests on support surfaces 24A butting against matching support surfaces of the circular distributors 22 and 22A. In FIG. 1, the movable needle-valve is shown in a forward position, i.e., toward the right as viewed in the drawing, permitting the annular chamber 23 to communicate, via an annular duct 25 disposed between a front part 16 and a rear part 17 of the extrusion head 1, with an outer front portion of the outer duct 14 already conveying the extrudate coming from the main extruder. Thus, the flow of material coming from the auxiliary extruder connected to the intake port 20, passing through the bent line 21, the circular distributor 22, the chamber 23, and the annular duct 25, surrounds the main flow of material, thus giving the desired coloration to an insulated conductor 3 leaving the extrusion head 1 after passing through the die and the extrusion needle-valve, just sketched in broken lines in FIG. 1.

Means 4 for controlling the displacement of the movable needle-valve in a preferred embodiment of the invention are composed here of an actuator 40 capable of causing a control shaft 41 to pivot by a quarter of a turn in either direction. The movable needle-valve 24 likewise comprises two radial ducts 27 and 27A passing through a circular recess 26 and opening out at outlet ports 28 and 28A; the radial ducts 27 and 27A communicate with ducts 43 and 43A in the following way: when the control shaft 41 is in a certain angular position—that shown in FIG. 1—the duct 43 is disposed perpendicular to the duct 27, thus cutting it off from its outlet port 28, whereas the duct 43A permits the radial duct 27A to communicate with its outlet port 28A. Rotation of the control shaft 41 by a quarter of a turn cuts the radial duct 27A off from its outlet port 28A and allows the radial duct 27 to communicate with its outlet port 28.

The operation of the inventive extrusion head 1 can now be described. A first extruder feeds extrudate, preferably not colored, to the first intake port 10. This material passes in a conventional manner through the duct 11 and is distributed about the diestock 13 by following the outer duct 14. The output of extrudate supplied by this first extruder may be relatively high since this material will constitute most of the insulation of the insulated conductor 3. Two other extruders having a lower output feed the intake ports 20 and 20A with extrudate, each extruder supplying material of a different color. As described earlier, the two flows of colored extrudate reach the two annular chambers 23 and 23A surrounding the movable needle-valve 24. Upon scrutinizing the drawing, it will be seen that the material contained in the chamber 23 cannot escape through duct 27 and outlet port 28 since the control shaft 41 is positioned in such a way as to block this passage; the material contained in the chamber 23A, on the other hand, can escape through the port 28A since it communicates with that chamber via ducts 27A and 43A. Thus, the pressure within the chamber 23 will tend to increase, whereas the pressure in the chamber 23A will remain low, the effect of which will be to push the movable needle-valve 24 toward the front, i.e., to the right as viewed in the drawing, thus freeing the passage between the chamber 23 and the annular duct 25. In this way, the extrudate contained in the chamber 23, which material is of a first color and comes from the first auxiliary extruder, surrounds the main flow of extrudate already circulating in the outer duct 14 and covers this material with a colored film. Thereafter, the flow of material consisting of a colored outer layer superimposed on a non-colored lower layer continues to follow the outer duct 14 in the direction of the die 15 to coat the conductor in a conventional manner. After opening of the passage between the chamber 23 and the annular duct 25, the pressure prevailing in the chamber 23 remains higher than that in the chamber 23A, thus keeping the movable needle-valve 24 in position.

If it is desired to change the color of the coating on the insulated conductor 3, it suffices to operate the actuator 40 so that it causes the control shaft 41 to make a quarter of a turn, i.e., so that it blocks the passage of the duct 27A and frees that of the duct 27, in order to increase the pressure within the annular chamber 23A and to decrease the pressure within the chamber 23, thus controlling the movement of the movable needle-valve 24 toward the rear, i.e., toward the left as viewed in the drawing, thereby cutting off the communication between the chamber 23 and the annular duct 25 and causing the latter to communicate with the chamber 23A which contains material of another color. Thus, material of the color supplied by the second auxiliary extruder will then surround the flow of insulator.

Thus, by actuating the control shaft 41 a quarter of a turn, it is possible to change the color of the surface layer of the insulated conductor quickly and easily.

Preferably, and in order to avoid having to mount rotary and sliding joints on the portion 42 of the control shaft 41, this shaft, or at least the portion 42 thereof, is also capable of moving axially with the movable needle-valve 24, thus making it possible to provide only conventional rotary joints 44. The control shaft 41 may be actuated by any means permitting this shaft to be pivoted by 90 degrees. The preferred embodiment provides a pneumatic or hydraulic actuator 40, but simpler means may be provided instead, e.g., one end of shaft 41 may terminate in a hexagon head or square head so that the shaft may be actuated by means of a suitable wrench.

FIG. 1 shows only a fundamental view of the operation of the extrusion head, means known per se in the art permitting the various components of this head to be positioned and fixed to one another and their mutual fluid-tightness to be ensured, nor are the means for attaching the head to the extruder shown.

In the mode of operation described above, it is stated that the two auxiliary extruders operate simultaneously and that the colored extrudate not used is exhausted. Preferably, the extruder whose material is not being used for the moment to color the insulated conductor is stopped, or its speed of operation, hence its output, is greatly reduced in order to save on coloring agent. Another advantage of stopping or slowing down this extruder is that the pressure in the annular chamber connected to this extruder is thus further reduced, thereby ensuring that the movable needle-valve 24 is kept better in position. When it is desired to change the coating color, it will suffice to accelerate the extruder not in use up to its nominal speed a few seconds beforehand in order to eliminate any faulty material, then to operate the color change, and finally to stop or slow down the other extruder not being used.

The appreciable advantages of this extrusion head as compared with those of the prior art are especially the very short length of common conduit where the two colored materials could mix at the time of a color change; in fact, as may be seen in the drawing, this mixture can take place only in the annular duct 25, the length of which may be less than 1 mm. A very precise color change is thus obtained on the insulated conductor. Moreover, since the non-used colored material is exhausted, at least just before the color change, and since the colored material can stagnate only in the portion of the duct 27 or 27A blocked by the portion 42 of the shaft 41, i.e., downstream in the direction of flow of the streams of material relative to the point of insertion of the conductor to be insulated, this material thus being able to escape only to the outside at the time of the next color change, it is certain that no faulty material can reach the insulated conductor.

Figure 2:
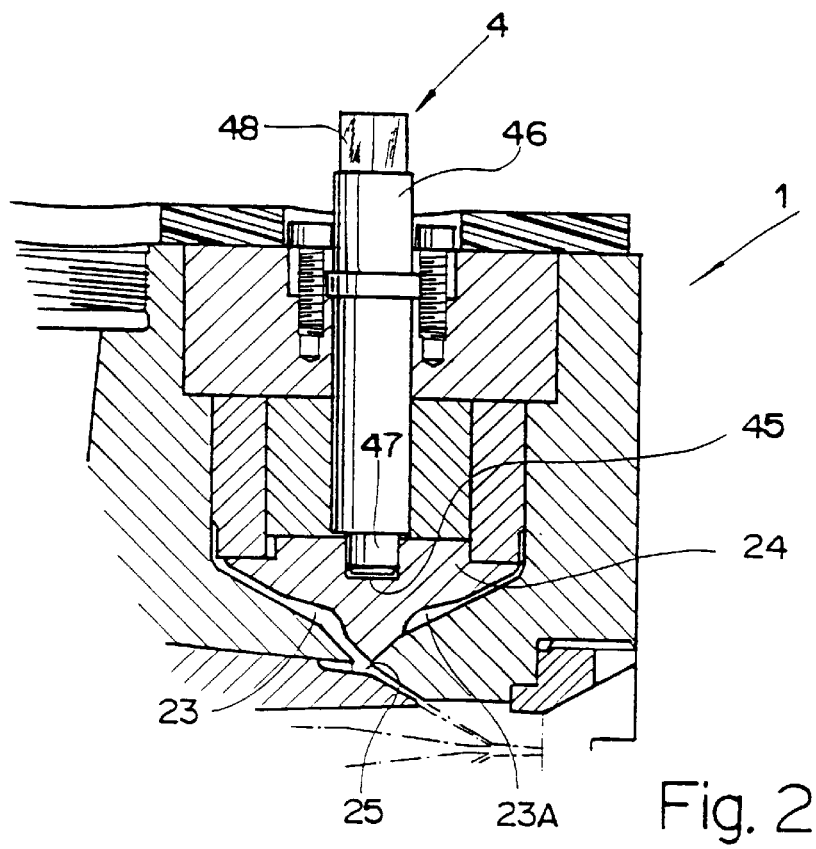
FIG. 2 is a partial sectional view of an extrusion head equipped with another type of device for controlling color changing.

Control means 4 for displacing the movable needle-valve 24 in a second embodiment of the invention are illustrated in FIG. 2, in which only part of the extrusion head 1 is shown. The movable needle-valve 24 comprises at least one slot portion 45 disposed on its outer perimeter, this slot portion extending over a certain length of that perimeter. A control shaft 46 pivots in a suitable circular seat in the head 1, the end of shaft 46 closer to the movable needle-valve 24 comprising a cylindrical portion 47, the axis of which is slightly shifted in the axial direction of the head 1. The diameter of the cylindrical portion 47 is very slightly less than the width of the slot 45 so that it can engage the latter. The other end of the control shaft 46 is provided here with a square head 48 for controlling the pivoting of this shaft. Thus, in a first angular position of the control shaft 46, the cylindrical portion 47 rests against a first face of the slot 45, pressing the movable needle-valve 24 in this direction, whereas by pivoting the control shaft 46 half a turn, the cylindrical portion 47 comes to rest against the opposite face of the slot 45, then pressing the movable needlevalve in the other direction. As in the previous embodiment, depending on the direction in which the movable needle-valve 24 is pressed, either the annular chamber 23 or 23A is caused to communicate with the annular duct 25. The movable needle-valve 24 will preferably be provided with several slots 45, i.e., with several control shafts 46, distributed over its circumference, so as to avoid a slantwise positioning of the movable needle-valve 24 in its seat. The number of control shafts 46 depends essentially on the size of the extrusion head 1, hence on the diameter of the insulated conductor 3 including the insulation; for a small-diameter conductor, e.g., for telephone wire, two control shafts may be sufficient, whereas three or four control shafts might be necessary for conductors of larger diameter. Although pivoting of the control shaft 46 has been described as being controlled by a wrench actuating the square head 48, it will be understood that a device of the same type as the actuator 40 of the first embodiment may equally well be used.

The means for controlling the movement of the movable needlevalve 24 in both embodiments described above may be combined, the device or devices comprising the off-center cylinder 47 acting upon the slot 45 then being used more for locking and security when the color change has been actuated by the device comprising the control shaft 41.

Figure 3A:
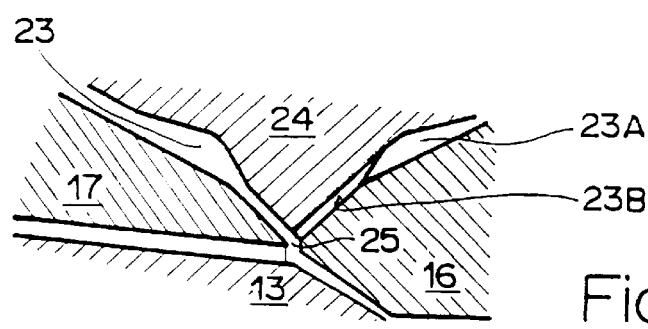
FIG. 3A is a sectional detail of means for extruding two different colors simultaneously.
Figure 3B:
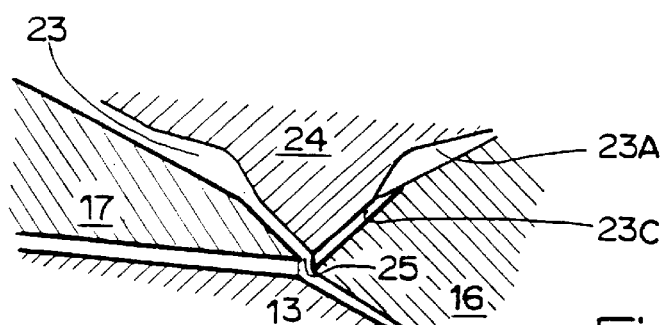
FIG. 3B is another sectional detail of means for extruding two different colors simultaneously.

Two particular modifications of the passage between one of the chambers 23 or 23A and the annular duct 25 are shown in FIGS. 3A and 3B for extruding two-color insulation, i.e., insulation comprising a base color and one or more longitudinal stripes of another color. For this purpose, at least one portion of one of the support faces of the movable needle-valve 24 includes an aperture 23B (FIG. 3A) for causing the chamber 23A to communicate with the duct 25 even though the needle-valve 24 is resting against the front portion 16 of the extrusion head. Thus, the colored material coming from the chamber 23 will constitute the base color, while that coming from the chamber 23A will constitute one or more stripes, depending upon the number of apertures 23B, the circumferential width of which will depend upon the circumferential width of the apertures. As another modification, illustrated in FIG. 3B, apertures 23C may be contrived on the support surfaces of the part forming front portion 16. In both cases, if the movable needle-valve 24 is pushed toward the rear, i.e., toward the left as viewed in the drawings, the duct 25 is fed only by the colored material coming from the chamber 23A, the insulated conductor then being of only one color. The apertures 23B and 23C may obviously be made on the other side of the movable needle-valve 24. The movable needle-valve 24 is operated according to one or the other actuation means described above in the first and second embodiments of the invention.

Although the foregoing description and associated drawings show an extrusion head adapted for the extrusion of insulation on a conductor, this particular application is not to be taken as limiting the invention. Such a head may also be used for extruding a two-layer coating on fiber optics, as well as for the extrusion of all products of circular geometry, such as tubes or bars. By modifying the geometry of the extrusion head, all sorts of shapes may be extruded, even flat slabs comprising two or three layers. Those skilled in the art will be able to adapt the devices described above to these different possibilities, as well as to other types of extruded products than those mentioned, e.g., to expanded insulation.

An extrusion head as described may easily be installed on an existing extruder, which will then act as the main extruder, the two auxiliary extruders then being added to the line, or the head may easily and advantageously be installed in place of the extrusion head and the separate device for reversal of the colors described in the patent initially mentioned.

What is claimed is:

1. An extrusion head capable of extruding a surface layer over a first layer, wherein said extrusion head is connected directly to a first extruder delivering an extrudate intended to form said first layer, as well as two other extruders, each delivering an extrudate of a different color intended to form said surface layer, said extrusion head comprising a selection device capable of selectively directing one or the other of the colored extrudates over said first layer, said selection device comprising a movable needle-valve, axially displaceable, capable when acted upon by displacement control means of simultaneously establishing a first connection between a first chamber filled with an extrudate of a first color and a duct conveying said extrudate over the extrudate forming said first layer and blocking a second connection between a second chamber filled with an extrudate of a second color and said duct, or of simultaneously cutting off said first connection and establishing said second connection.

2. The extrusion head of claim 1, wherein said selection device further comprises blocking means for simultaneously blocking an escape of colored extrudate from one of said chambers, leading to an increase in pressure in said chamber, and for permitting the escape of colored extrudate from the other said chamber, leading to a reduction in pressure in said other chamber, the axial displacement of said movable needle-valve being brought about by the difference in pressure between the two said chambers.

3. The extrusion head of claim 2, wherein said blocking means comprise two ducts disposed transversely and shifted angularly with respect to one another, said two ducts being situated on a portion of a control shaft capable of assuming two certain angular positions, said portion of said shaft being situated in a circular seat contrived in a portion of said movable needle-valve, each of said two ducts being capable of blocking and/or permitting the escape of colored material from said chambers according to the angular position of said control shaft.

4. The extrusion head of claim 3, wherein said two certain angular positions of said control shaft, as well as said two ducts contrived transversely in a portion of said shaft, are shifted by 90 degrees.

5. The extrusion head of claim 3, wherein at least said portion of said control shaft situated in said circular seat contrived in said movable needle-valve can slide axially with said needle-valve.

6. The extrusion head of claim 1, wherein said means for controlling the displacement of said movable needle-valve comprise at least one control shaft disposed radially in a seat in said head, one end of said shaft comprising a cylindrical bearing surface, the axis of which is shifted relative to that of said control shaft, said cylindrical bearing surface engaging a slot contrived in an upper portion of said movable needle-valve, pivoting of said control shaft by half a turn being capable of controlling the axial displacement of said movable needle-valve.

7. The extrusion head of claim 1, wherein said selection device further comprises blocking means for simultaneously blocking an escape of colored extrudate from one of said chambers, leading to an increase in pressure in said chamber, and for permitting the escape of colored extrudate from the other said chamber, leading to a reduction in pressure in said other chamber, the axial displacement of said movable needle-valve being brought about by the difference in pressure between the two said chambers, wherein said means for controlling the displacement of said movable needle-valve comprise at least one control shaft disposed radially in a seat in said head, one end of said shaft comprising a cylindrical bearing surface, the axis of which is shifted relative to that of said control shaft, said cylindrical bearing surface engaging a slot contrived in an upper portion of said movable needle-valve, pivoting of said control shaft by half a turn being capable of controlling the axial displacement of said movable needle-valve.

8. The extrusion head of claim 2, wherein at least one control shaft is pivotingly actuated by a pneumatic or hydraulic actuator.

9. The extrusion head of claim 2, wherein at least one control shaft is pivotingly actuated by means of a shaped wrench, one end of said control shaft being fitted according to the matching shape.

10. The extrusion head of claim 1 further comprising at least one partial passage between said movable needle-valve and a surface portion on which it rests in closing position, in order to leave free the passage of an extrudate of one color coming to be combined with the extrudate of the other color in order to form a two-color coating.

11. An extrusion line equipped with a main extruder, two auxiliary extruders, and an extrusion head according to claim 1.

* * * * *